United States Patent [19]

Sakanaka et al.

[11] Patent Number: 5,610,748
[45] Date of Patent: Mar. 11, 1997

[54] OPTICAL SPACE COMMUNICATION APPARATUS SENDING MAIN SIGNALS AND AN AUXILIARY SIGNAL FOR CONTROLLING THE INTENSITY AT THE RECEIVER

[75] Inventors: Tetsuo Sakanaka, Sagamihara; Yasuhiro Takahashi, Urawa, both of Japan

[73] Assignee: Canon Kabushiki Kaisha, Tokyo, Japan

[21] Appl. No.: 415,586

[22] Filed: Apr. 3, 1995

Related U.S. Application Data

[63] Continuation of Ser. No. 974,988, Nov. 12, 1992, abandoned.

[30] Foreign Application Priority Data

Nov. 15, 1991 [JP] Japan ................................. 3-300701

[51] Int. Cl.$^6$ ....................................... H04B 10/00
[52] U.S. Cl. ......................... 359/154; 359/159; 359/172
[58] Field of Search ................................. 359/115, 117, 359/124–126, 152–154, 159, 173, 175–176, 187–189, 190, 194, 195, 172

[56] References Cited

U.S. PATENT DOCUMENTS

| | | | |
|---|---|---|---|
| 3,546,465 | 5/1968 | Arnaud | 359/154 |
| 3,566,128 | 6/1968 | Arnaud | 359/154 |
| 4,330,870 | 5/1982 | Arends | 359/194 |
| 4,501,022 | 2/1985 | Oswald | 359/194 |
| 4,562,582 | 12/1985 | Tokura et al. | 359/176 |
| 5,214,524 | 5/1993 | Shigematsu et al. | 359/154 |
| 5,245,459 | 9/1993 | Faulkner et al. | 359/191 |
| 5,267,071 | 11/1993 | Little et al. | 359/194 |

FOREIGN PATENT DOCUMENTS

| | | | |
|---|---|---|---|
| 0084034 | 5/1985 | Japan | 359/194 |
| 2245122 | 12/1991 | United Kingdom | 359/110 |
| 2245120 | 12/1991 | United Kingdom | 359/110 |

*Primary Examiner*—Wellington Chin
*Assistant Examiner*—Rafael Bacares
*Attorney, Agent, or Firm*—Fitzpatrick, Cella, Harper & Scinto

[57] ABSTRACT

An optical space communication apparatus comprises a transmitter and a receiver. The transmitter has a main signal generator for producing a main signal, an auxiliary signal generator for producing an auxiliary signal in a frequency band different from that of the main signal, a combiner for combining the main signal with the auxiliary signal, an electro-optical converter for converting a combined signal of the main signal and the auxiliary signal into a light signal, and a transmission optical system for transmitting the light signal formed in light beam. The receiver has a reception optical system for receiving the light signal in light beam and a photo-electric converter for converting the light signal into an electric signal. The receiver further has a separator for separating the electric signal converted by the photo-electric converter into a main signal and an auxiliary signal, and an auxiliary signal detector for detecting the auxiliary signal separated by the separator.

14 Claims, 5 Drawing Sheets

OPTICAL SPACE COMMUNICATION APPARATUS SENDING MAIN SIGNALS AND AN AUXILIARY SIGNAL FOR CONTROLLING THE INTENSITY AT THE RECEIVER

This application is a continuation, of application Ser. No. 07/974,988 filed Nov. 12, 1992 now abandoned.

BACKGROUND OF THE INVENTION

1. Field of the Invention

The present invention relates to an optical space communication apparatus for communication by means of an intensity-modulated light signal propagating in a free space.

2. Related Background Art

A conventional optical space communication apparatus is explained below with reference to FIGS. 1 and 2.

FIG. 1 is a block diagram to show an example of the conventional optical space communication apparatus, which is provided with a transmitter 500 and a multiplex modulator 700 and with a receiver 600 and a multiplex demodulator 800.

In the transmitter 500, reference numeral 501 designates an input terminal of a main signal. An electric signal input into the input terminal 501 is converted by an electro-optical converter 503 into a light signal, and the thus-converted light signal is sent through an optical system 502 in a form of light beam 506. The electro-optical converter 503 uses a light emitting device such as a laser diode (LD) and a light emitting diode (LED).

The multiplex modulator 700 is constructed as shown in FIG. 3. Sub-carriers 32a to 32d are selected at sufficient gaps to avoid mutual overlap of adjacent channels. The sub-carriers 32a to 32d are modulated by input signals of respective channels in modulators 31a to 31d, the modulated signals are multiplexed in a combiner (multiplexer) 33, and the multiplexed signal is transferred to the input terminal.

Since the optical communication may serve as a broad-band communication, signals in a broad band are normally used for the input main signal. For example, as shown in FIG. 1, in case that the multiplex modulator 700 is connected to the transmitter 500 to transmit video signals of four channels ($Ch_1$, $Ch_2$, $Ch_3$, $Ch_4$), a frequency band of the main signal ranges from several tens to several hundred MHz. (A transmission distance of the light beam signal is between several tens m and several hundred m. Although the complexity of the circuit and the optical system depends upon a distance, the fundamental construction remains unchanged.)

The light beam signal transmitted from the transmitter 500 is received by the receiver 600. In the receiver 600, the light signal is first converged by an optical system 601 onto a light receiving element in a photo-electric converter 603. An avalanche photodiode (APD), a PIN photodiode, or the like may be employed as the light receiving element. The main signal is converted by the photo-electric converter 603 into an electric signal, the electric signal is then amplified by an AGC amplifier 604, and the amplified signal is output from an output terminal 609. The receiver 600 as shown in FIG. 1 is connected to the multiplex demodulator 800. The output signal output from the output terminal 609 is separated and demodulated into four channels of video signals in the multiplex demodulator 800.

Also, in the receiver 600, a wave detection circuit 606 is used to detect a signal level of the main signal and then to monitor an intensity of reception light through a level meter 608. Further, the signal level detected is fed back to the AGC amplifier 604 to control a gain of the AGC amplifier 604, so that the level of the output signal from the output terminal 609 may be stabilized against fluctuations of the input light level. In the apparatus using the APD as the light receiving element of the photo-electric converter 603 as described above, there is such an example of the stabilization of the output signal level against fluctuations of the input light level that the signal level detected by the detection circuit 606 is fed back to a bias voltage control circuit 607 for the APD and that a bias voltage of the APD is changed depending upon the input light level to change a multiplication factor of the APD.

Some type of the transmitter 500 has a pilot signal generator 505 for generating an auxiliary signal (as will be referred to as a "pilot signal") with a frequency $f_1$ outside the frequency band of the main signal. In this case, the pilot signal is frequency-multiplexed with the main signal in a combiner (multiplexer) 502, and the combined signal is transmitted. In a receiver for such a transmitter, a part of the received light is separated by a beam splitter 602, and is then received by a photo detector 605. The signal received by the photo detector 605 is used for example to detect a position offset of the light beam 506. In one type of the receiver such as a receiver 600A as shown in FIG. 2, a reception level of the pilot signal is detected by a pilot signal detector 610 to monitor the reception light level.

There are, however, the following problems recognized in the aforementioned conventional techniques.

The level meter 608 as shown in FIGS. 1 and 2 is necessary for position adjustment upon installation of communication line and for monitoring a reception condition in operation. The light signal received by the receiver is a direct current light intensity-modulated, in which an alternating current (AC) light signal is superimposed on a direct current (DC) light signal. An average light level, that is, the direct current light portion, is necessary for monitoring the reception light level. Because the AC light component contained in the signal changes depending upon a condition of the system. For example, the signal level changes depending upon the number of channels (multiplicity) of the video signal input from the multiplex modulator 700 in FIG. 1. The signal level also changes depending upon a length of cable, because a signal is attenuated in the cable 507 between the multiplex modulator 700 and the transmitter 500. In case of the receiver 600 as shown in FIG. 1, the detection circuit 606 detects the signal level received. In this case, the detection circuit 606, however, detects a level of the AC light signal component in the reception light level, but does not detect the reception light level itself actually necessary. In an extreme case, even if the light beam is correctly adjusted in position to be received, but if the signal is not connected to the transmitter, an indication that the light is not received is given.

In contrast, in case of the receiver 600A as shown in FIG. 2, such a problem may not occur, because a relation between the level of the pilot signal and the intensity of light is constant. However, in case of the receiver 600A, the level monitor indicates the level of the pilot signal light entering the photo detector 605, but does not reflect a level of the light entering the photo-electric converter 603, which is the light receiving element for receiving the transmitted signal. The reason is as follows. For exact indication, the photo-electric converter 603 must be completely coincident with the photo detector 605 in position relation with respect to the optical axis. It is extremely difficult that they are installed in such a complete position relation. There may be a condition that one light receiving element receives the full light incident thereinto, but the other light receiving element fails to receive the full light incident thereinto with a part of the light being off. Further, since the photo-electric converter 603 is usually different in frequency and band of the reception light from the photo detector 605, converter 603 and detector 605 employ respective elements different in size of reception plane and in kind. Thus, there could be a state in which one of the elements receives a light incident thereinto, but the other does not. Neither of the above examples can accurately monitor the light reception level accordingly.

SUMMARY OF THE INVENTION

The present invention has been accomplished taking into account the problems present in the above-described conventional techniques. It is an object of the present invention to provide an optical space communication apparatus capable of accurately monitoring a light reception level.

An optical space communication apparatus according to the present invention comprises: a transmitter having a main signal generator, an auxiliary signal generator for producing an auxiliary signal in a frequency band different from that of the main signal, a combiner for combining the main signal with the auxiliary signal, an electro-optical converter for converting a combined signal of the main signal and the auxiliary signal into a light signal, and a transmission optical system for transmitting the light signal formed in light beam; and a receiver having a reception optical system for receiving the light signal in light beam and a photo-electric converter for converting the light signal into an electric signal; in which the receiver has a separator for separating the electric signal converted by the photo-electric converter into a main signal and an auxiliary signal, and an auxiliary signal detector for detecting the auxiliary signal separated by the separator.

In the optical space communication apparatus, the receiver may use an avalanche photodiode as a light receiving element, and a multiplication factor of the avalanche photodiode may be controlled with a detection output signal of the auxiliary signal detector; the receiver may have an amplifier for amplifying the main signal separated by the separator, and a gain of the amplifier may be controlled with a detection output signal of the auxiliary signal detector; the receiver may have a level meter for monitoring a detection output signal of the auxiliary signal detector; and there may be provided a multiplex modulator for multiplexing a plurality of channels of video signal to supply a multiplex signal as a main signal to the transmitter and a multiplex demodulator for demodulating the main signal separated by the separator.

In the optical space communication apparatus of the present invention, a ratio of an intensity of the light beam incident into the photo-electric converter of the receiver to a signal level of the auxiliary signal is always constant irrespective of the signal level of the main signal input into the transmitter, so that an accurate light reception intensity may be recognized by using the detection output signal of the auxiliary signal detector of the receiver.

DETAILED DESCRIPTION OF THE PREFERRED EMBODIMENTS

Embodiments of the present invention are next explained with reference to the accompanying drawings.

Figure 4:
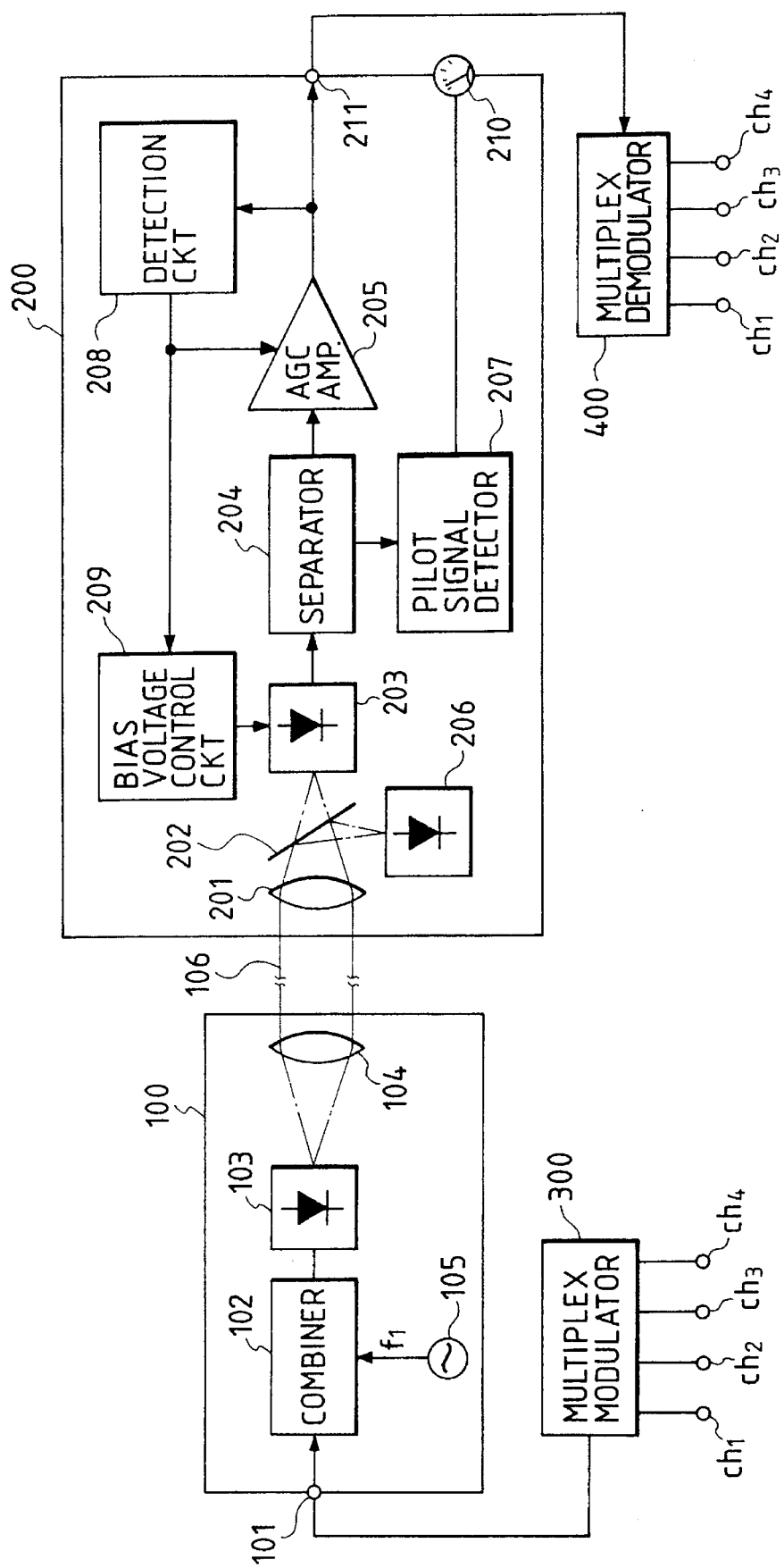
FIG. 4 is a block diagram to show a first embodiment of an optical space communication apparatus according to the present invention.

FIG. 4 is a block diagram to show the first embodiment of an optical space communication apparatus according to the present invention.

The optical space communication apparatus of the present embodiment is provided with a transmitter 100 and a multiplex modulator 300 and with a receiver 200 and a multiplex demodulator 400.

Figure 1:
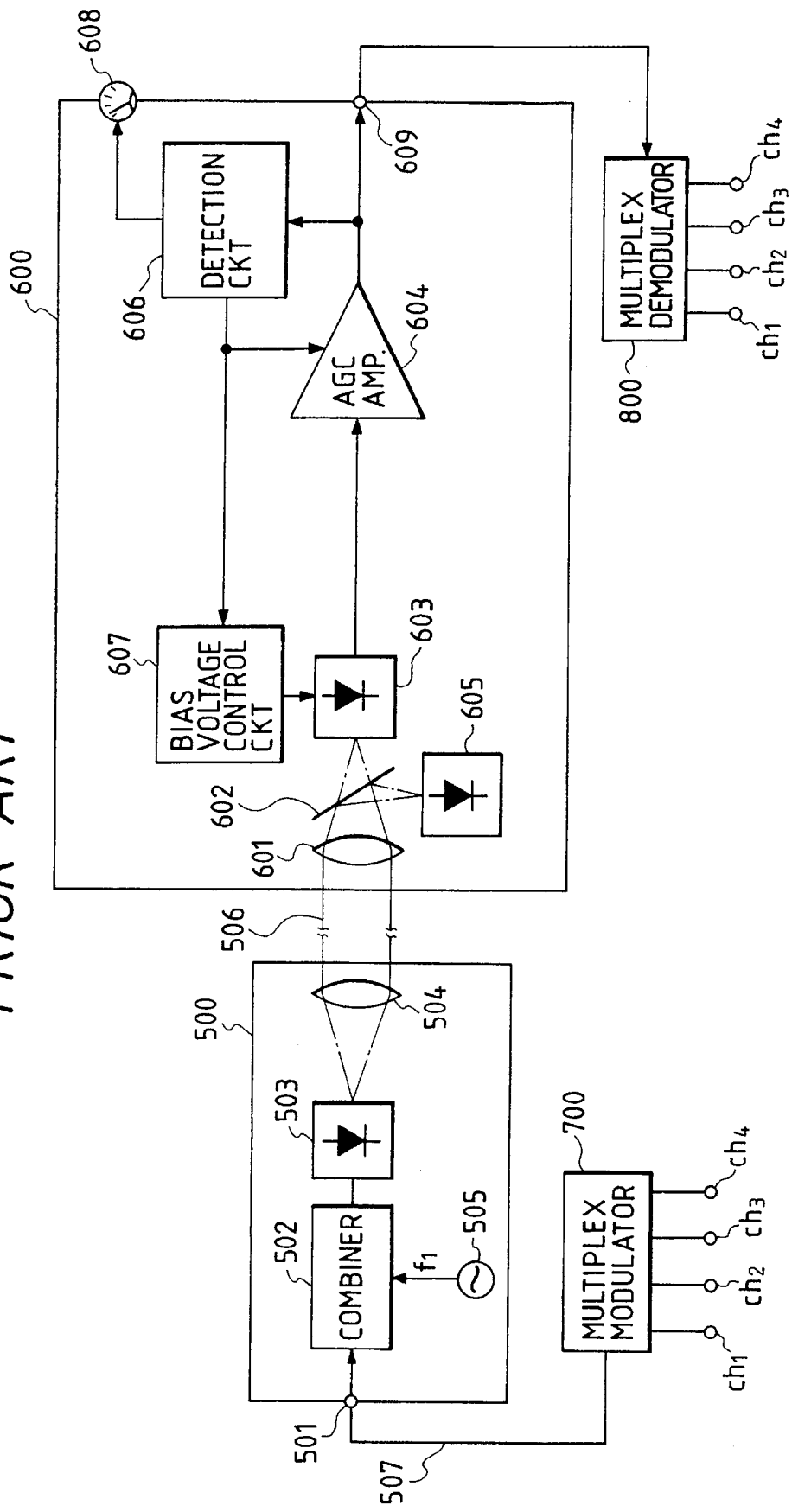
FIG. 1 is a block diagram to show an example of a conventional optical space communication apparatus.
Figure 2:
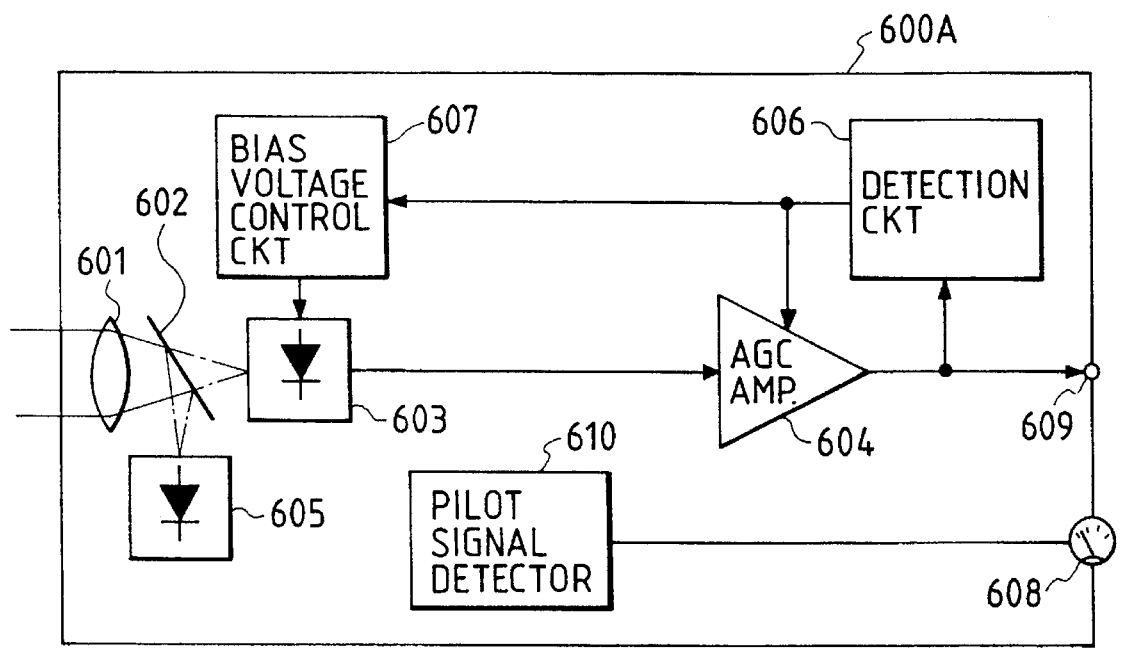
FIG. 2 is a block diagram to show another example of a receiver in a conventional optical space communication apparatus.
Figure 3:
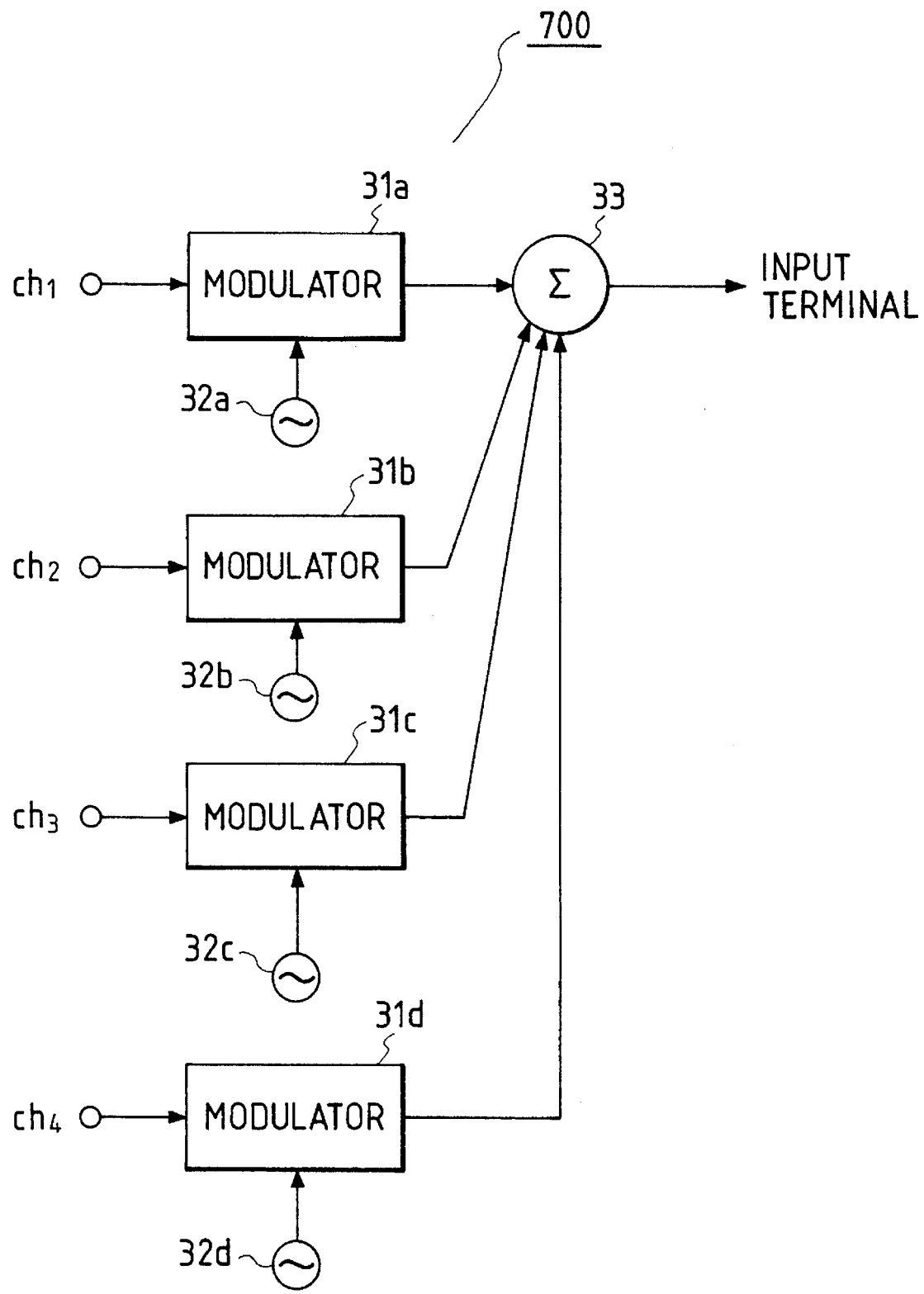
FIG. 3 is a drawing to illustrate a multiplex modulator.

The transmitter 100 is structured in the same manner as that as explained above with FIG. 1, which comprises a combiner (multiplexer) 102, an electro-optical converter 103, an optical system 104, and a pilot signal generator 105. In the transmitter 100 of the present embodiment, a pilot signal generated by the pilot signal generator 105 is set at a frequency $f_1$ in a band lower than a frequency band of a main signal input through an input terminal 101.

The multiplex modulator 300 is also structured in the same manner as that in the above-described conventional apparatus, which modulates four channels ($Ch_1$, $Ch_2$, $Ch_3$, $Ch_4$) of video signals, multiplexes the four channels, and transfers the multiplex signal as a main signal to the transmitter 100.

The receiver 200 comprises an optical system 201, a beam splitter 202, a photo-electric converter 203, a separator (branching filter) 204, an AGC amplifier 205, a photo detector 206, a pilot signal detector 207, a detection circuit 208, a bias voltage control circuit 209, and a level meter 210.

The optical system 201 converges a light beam 106 transmitted from the transmitter 100, through the beam splitter 202 onto the photo-electric converter 203.

The photo detector 206 detects a part of the light beam 106 reflected by the beam splitter 202 to detect a position deviation of the light beam 106. An APD (avalanche photodiode) is employed as a light receiving element in the photo-electric converter 203 to convert the converged light into an electric signal.

The separator 204 separates the signal converted into the electric signal in the photo-electric converter 203 into a main signal and a pilot signal. The separator 204 is constructed by a low-pass filter and a high-pass filter, by which the main signal with a higher frequency is separated from the pilot signal with a lower frequency $f_1$. The main signal separated by the separator 204 is passed through the AGC amplifier 205, and is output from an output terminal 211. The signal output through the output terminal 211 is transferred to the multiplex demodulator 400.

The pilot signal detector 207 detects a reception level of the pilot signal separated by the separator 204 to indicate the reception level at a level meter 210.

The detection circuit 208 detects an output signal level of the AGC amplifier 205 to control a gain of the AGC amplifier 205 so as to stabilize the output signal level against fluctuations of the input light level of the receiver 200.

The bias voltage control circuit 209 feeds a gain control signal output by the detection circuit 208 back to the photo-electric converter 203 to change a multiplication factor of the APD constituting the photo-electric converter 203 so as to stabilize the output signal level against fluctuations of the input light level.

An operation of the present embodiment is explained in the following.

The four channel main signal (video signal) is first transferred from the multiplex modulator 300 to the transmitter 100, and is then combined with the pilot signal of frequency $f_1$ in the combiner 102 of the transmitter 100. The combined signal of the main signal with the pilot signal is converted into a light signal in the electro-optical converter 103, and is then transmitted through the optical system 104 in a form of the light beam 106. The light beam 106 transmitted from the transmitter 100 is received through the optical system 201 and the beam splitter 202 in the receiver 200. The light beam 106 received by the receiver 200 is converged through the optical system 201 onto the photo-electric converter 203, and is converted into an electric signal in the photo-electric converter 203. The combined signal of the main signal with the pilot signal as converted into the electric signal is separated by the separator 204 into a main signal and a pilot signal. The main signal is transferred through the AGC amplifier 205 to the multiplex demodulator 400. In the multiplex demodulator 400, the main signal, comprised of four channels of video signals is demodulated into four channels of video signals.

On the other hand, the pilot signal separated by the separator 204 is passed through the pilot signal detector 207, and a signal level thereof is indicated at the level meter 210.

In the indication of the pilot signal level, a ratio of the intensity of the light beam 106 incident into the photo-electric converter 203 to a detection level of the pilot signal is always constant irrespective of the level of the main signal input into the transmitter 100, so that an indication of the signal level at the level meter 210 in the present embodiment may accurately monitor the intensity of the reception light.

As described above, the optical space communication apparatus according to the present invention comprises: the transmitter 100 having the main signal generator (multiplex modulator 300), the pilot signal generator 105 for producing the auxiliary (pilot) signal in a frequency band different from that of the main signal, the combiner 102 for combining the main signal with the auxiliary signal, the electro-optical converter 103 for converting a combined signal of the main signal and the auxiliary signal into a light signal, and the optical system 104 for transmitting the light signal formed in light beam; and the receiver 200 having the optical system 201 for receiving the light signal in light beam, the photo-electric converter 203 for converting the light signal into an electric signal, the separator 204 for separating the electric signal converted by the photo-electric converter 203 into a main signal and an auxiliary (pilot) signal, and the pilot signal detector 207 for detecting the auxiliary (pilot) signal separated by the separator 204.

The second embodiment of the present invention is next explained with reference to FIG. 5.

Figure 5:
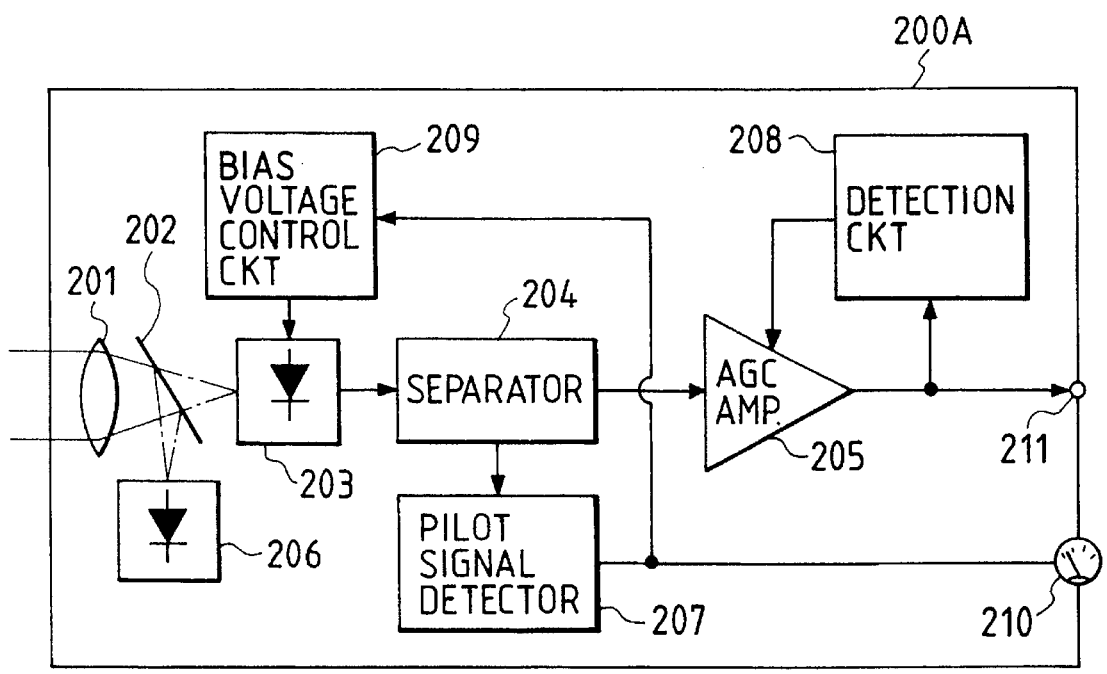
FIG. 5 is a block diagram to show a receiver in a second embodiment of the optical space communication apparatus according to the present invention.

FIG. 5 is a block diagram to show a receiver in the second embodiment of the optical space communication apparatus according to the present invention.

A receiver 200A as shown in FIG. 5 is structured in the same manner as the receiver 200 as shown in the aforementioned embodiment (see FIG. 4) except that the output signal of the pilot signal detector 207 is used as a control signal for controlling a multiplication factor of the APD, which is the light receiving element used in the photo-electric converter 203.

In the receiver 200A of the present embodiment, in addition to the level indication of the output of the pilot signal detector 207 at the level meter 210, the output of the detector 207 is fed back to the bias voltage control circuit 209 to change the APD bias voltage in accordance with the intensity of the reception light so as to change the multiplication factor of the APD of the photo-electric converter 203. The APD has an optimum multiplication factor to maximize an SN ratio of the reception signal with respect to the reception light intensity. In order to achieve a good reception condition, the bias voltage must be changed as to optimize the multiplication factor depending upon the intensity of the incident light of the APD. In the present embodiment, the control signal of the bias voltage is obtained from the pilot signal detection circuit 207, which accurately reflects the intensity of the incident light into the APD. Therefore, the receiver 200A of the present embodiment may be considered as further superior to the receiver 200 as shown in the previous embodiment (see FIG. 4).

The third embodiment of the present invention is explained in the following with reference to FIG. 6.

Figure 6:
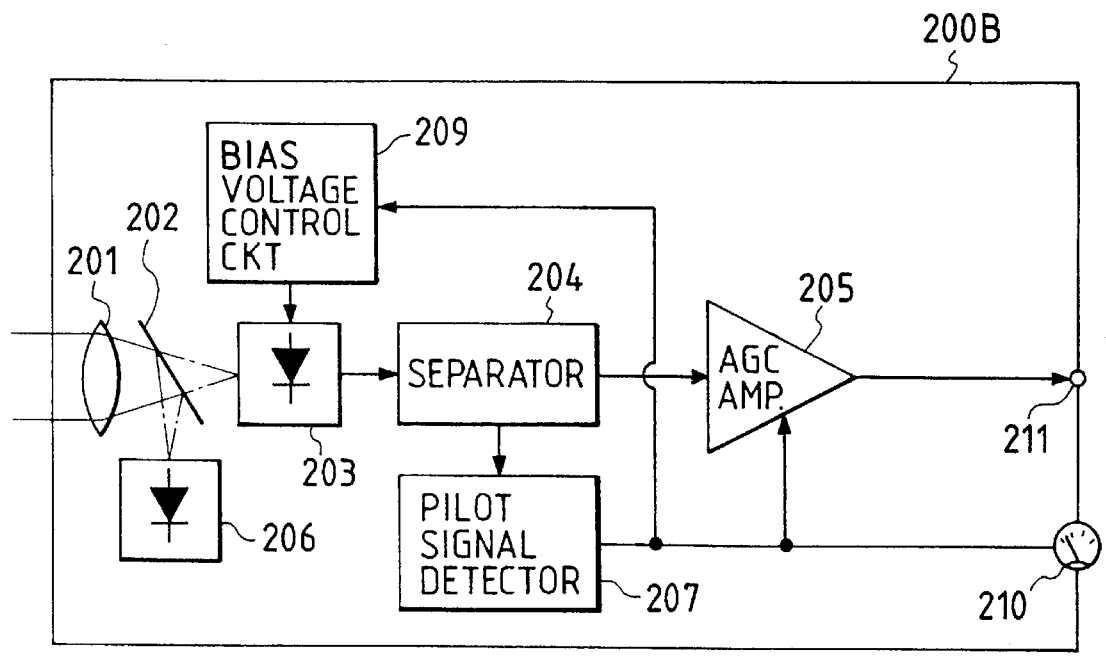
FIG. 6 is a block diagram to show a receiver in a third embodiment of the optical space communication apparatus according to the present invention.

FIG. 6 is a block diagram to show a receiver in the third embodiment of the optical space communication apparatus according to the present invention.

In a receiver 200B as shown in FIG. 6, the output of the pilot signal detector 207 is used for control of a gain of the AGC amplifier 205 as well as for feedback to the bias voltage control circuit 209. In this case, the output signal level from the output terminal 211 is not kept constant, but changes depending upon the number of channels transmitted. There is, however, an advantage that a signal level for each channel may be kept constant. If the level of the main signal included in the light signal changes depending upon a length of the cable for main signal input into the transmitter, the reception level of the main signal output from the output terminal 211 of the receiver 200B also changes depending thereon, but the SN ratio is not decreased thereby, which is not particularly disadvantageous. Further, in case of the receiver 200B of the present embodiment, unnecessary is the detection circuit 208 (see FIG. 5) for producing a signal for gain control of the AGC amplifier 205. The pilot signal detector 207 is a detection circuit for a narrow band only of the frequency $f_1$, while the detection circuit for gain control of the AGC amplifier 205 is one for a broad band width of 100 MHz, which requires a complicated, coupled circuit taking into account an impedance matching and in which a power loss of the main signal may occur. The omission of such a detection circuit must be a great merit.

According to the present invention as explained, using a detection output signal of an auxiliary signal, which after a light signal transmitted from the transmitter is converted into an electric signal, is separated from the electric signal, the light reception level may be accurately recognized in the receiver, and, in case of provision of the level meter for the detection output monitor as described in the embodiments, an operator may confirm the light reception level, which may allow the operator to quickly process a trouble in the communication apparatus.

Further, by using the detection output signal for control of multiplication factor of the photo-electric converter or for gain control of the amplifier for main signal amplification, an output signal may be obtained with more appropriate signal level and SN ratio, which may greatly increase the reliability as a communication apparatus.

What is claimed is:

1. An optical space communication apparatus comprising:

a transmitter having a main signal generator for producing a main signals an auxiliary signal generator for producing an auxiliary signal in a frequency band different from that of said main signal, a combiner for combining said main signal with said auxiliary signal, an electro-optical converter for converting a combined signal of said main signal and said auxiliary signal into a light signal, and a transmission optical system for transmitting said light signal in a light beam; and a receiver for receiving the light signal in the light beam, said receiver comprising:

(i) a photodetector for detecting a part of the light beam so as to detect a positional deviation of light beam;

(ii) a photo-electric converter for converting the light signal into an electric signal, said photoelectric converter including an avalanche photodiode as a light receiving element;

(iii) a separator for separating the electric signal converted by said photo-electric converter into a main signal and an auxiliary signal;

(iv) an auxiliary signal detector for detecting the auxiliary signal separated by said separator; and (v) a control circuit for controlling a multiplication factor of said avalanche photodiode using a detection output signal of said auxiliary signal detector.

2. An optical space communication apparatus according to claim 1, wherein said receiver has an amplifier for amplifying the main signal separated by said separator, a gain of said amplifier being controlled with a detection output signal of said auxiliary signal detector.

3. An optical space communication apparatus according to claim 1, wherein said receiver has a level meter for monitoring a detection output signal of said auxiliary signal detector.

4. An optical space communication apparatus according to claim 1, wherein said main signal generator has a multiplex modulator for multiplexing a plurality of channels of video signals to supply a multiplex signal as a main signal to said transmitter, and said receiver has a multiplex demodulator for demodulating the main signal separated by said separator.

5. An optical space reception apparatus for receiving a light signal in a light beam, comprising:

a photodetector for detecting a part of the light beam so as to detect a positional deviation of the light beam;

a photo-electric converter for converting said light signal into an electric signal, said photo-electric converter including an avalanche photodiode as a light receiving element;

a separator for separating the electric signal converted by said photo-electric converter into a main signal and an auxiliary signal;

an auxiliary signal detector for detecting the auxiliary signal separated by said separator; and a control circuit for controlling a multiplication factor of said avalanche photodiode using a detection output signal of said auxiliary signal detector.

6. An optical space reception apparatus according to claim 5, wherein said receiver has an amplifier for amplifying the main signal separated by said separator, a gain of said amplifier being controlled with a detection output signal of said auxiliary signal detector.

7. An optical space reception apparatus according to claim 5, wherein said receiver has a level meter for monitoring a detection output signal of sand auxiliary signal detector.

8. An optical space reception apparatus according to claim 5, wherein said receiver has a multiplex demodulator for demodulating the main signal separated by said separator.

9. An optical space communication apparatus comprising:

a transmitter having a main signal generator for producing a main signal, an auxiliary signal generator for producing an auxiliary signal in a frequency band different from that of said main signals a combiner for combining said main signal with said auxiliary signal, an electro-optical converter for converting a combined signal of said main signal and said auxiliary signal into a light signal, and a transmission optical system for transmitting said light signal in a light beam; and a receiver for receiving said light signal in the light beam said receiver comprising:

(i) a photodetector for detecting a part of the light beam so as to detect a positional deviation of said light beam;

(ii) a photo-electric converter for converting said light signal into an electric signal;

(iii) a separator for separating the electric signal converted by said photo-electric converter into a main signal and an auxiliary signal;

(iv) an amplifier for amplifying said main signal separated by said separator; and (v) an auxiliary signal detector for detecting the auxiliary signal separated by said separator, wherein a gain of said amplifier is controlled by a detection output signal of said auxiliary signal detector.

10. An optical space communication apparatus according to claim 9, wherein said receiver has a level meter for monitoring a detection output signal of said auxiliary signal detector.

11. An optical space communication apparatus according to claim 9, wherein said main signal generator has a multiplex modulator for multiplexing a plurality of channels of video signals to supply a multiplex signal as a main signal to said transmitter, and wherein said receiver has a multiplex demodulator for demodulating the main signal separated by said separator.

12. An optical space reception apparatus for receiving a light signal in a light beam, comprising:

a photodetector for detecting a part of the light beam so as to detect a positional deviation of the light beam;

a photo-electric converter for converting said light signal into an electric signal;

a separator for separating the electric signal converted by said photo-electric converter into a main signal and an auxiliary signal;

an amplifier for amplifying said main signal separated by said separator; and an auxiliary signal detector for detecting the auxiliary signal separated by said separator, wherein a gain of said amplifier is controlled by a detection output signal of said auxiliary signal detector.

13. An optical space reception apparatus according to claim 12, wherein said receiver has a level meter for monitoring a detection output signal of said auxiliary signal detector.

14. An optical space reception apparatus according to claim 12, wherein said receiver has a multiplex demodulator for demodulating the main signal separated by said separator.

* * * * *

UNITED STATES PATENT AND TRADEMARK OFFICE
CERTIFICATE OF CORRECTION

PATENT NO. : 5,610,748
DATED : March 11, 1997
INVENTOR(S) : TETSUO SAKANAKA, ET AL.

It is certified that error appears in the above-identified patent and that said Letters Patent is hereby corrected as shown below:

<u>COLUMN 3</u>

Line 42, "signal-" should read --signal--.

<u>COLUMN 5</u>

Line 34, "video signals is" should read --video signals, is--

<u>COLUMN 7</u>

Line 4, "signals" should read --signal,--
    Line 16, "photoelectric" should read --photo-electric--.
    Line 67, "sand" should read --said--.

<u>COLUMN 8</u>

Line 8, "signals" should read --signal,--.
    Line 14, "beam" should read --beam,--.

Signed and Sealed this

Sixteenth Day of September, 1997

Attest:

BRUCE LEHMAN

Attesting Officer     Commissioner of Patents and Trademarks